Dec. 9, 1958 J. H. SMITH 2,863,912
PROCESS OF SULFONATING ALKYL ARYL HYDROCARBONS
Filed Oct. 10, 1956
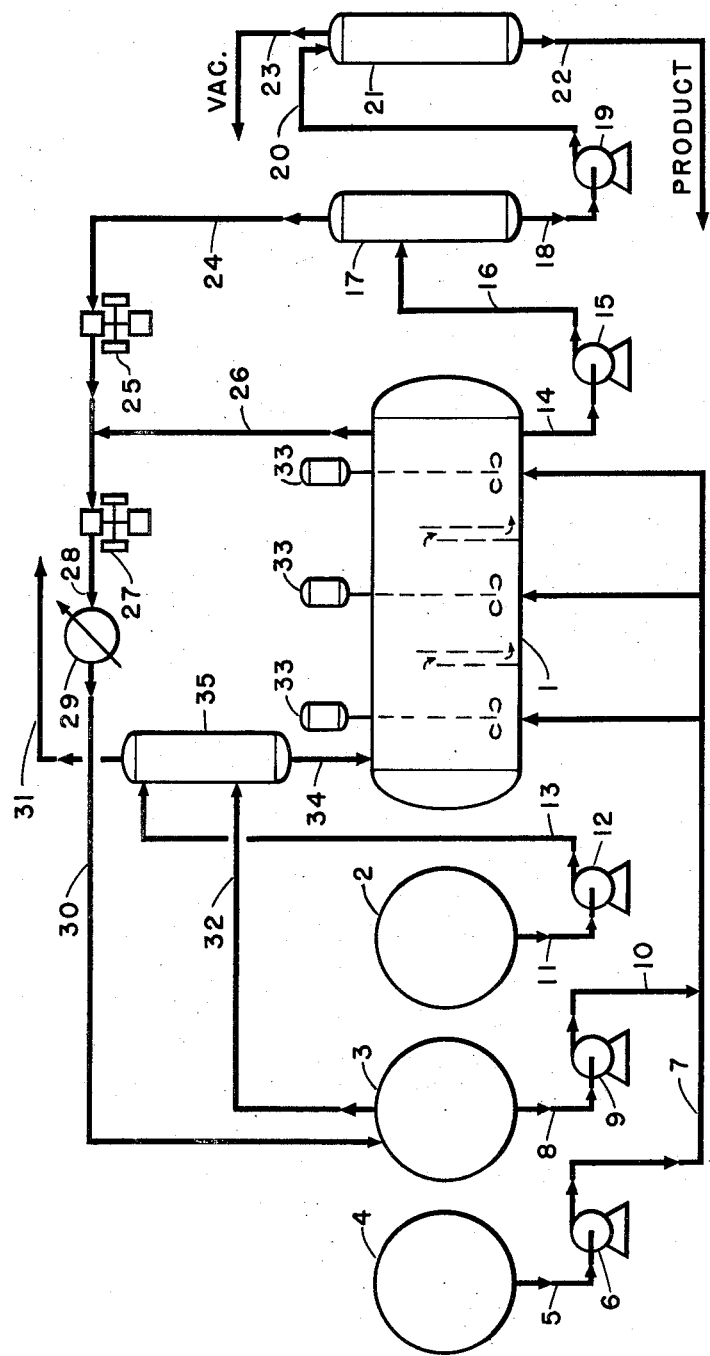
INVENTOR.
JOHN H. SMITH
BY *Floyd Trimble*
ATTORNEY

United States Patent Office 2,863,912
Patented Dec. 9, 1958

2,863,912

PROCESS OF SULFONATING ALKYL ARYL HYDROCARBONS

John H. Smith, Ponca City, Okla., assignor to Continental Oil Company, Ponca City, Okla., a corporation of Delaware Application October 10, 1956, Serial No. 615,082

7 Claims. (Cl. 260—505)

This invention relates to a process of sulfonating alkyl aryl hydrocarbons and more particularly to a process of sulfonating hydrocarbons in several stages while the hydrocarbon is dissolved in a solvent comprising sulfur dioxide, thus producing after neutralization alkyl aryl sulfonates of high purity which have improved surface active characteristics such as detergency, wetting demulsification, penetration and like phenomena without sacrifice of yield, color, or odor.

In the production of alkyl aryl sulfonic acids, an alkyl aryl hydrocarbon is treated under sulfonating conditions with a sulfonating agent such as sulfuric acid, oleum, and the like. The preferred alkyl aryl hydrocarbon to be sulfonated as well as the resulting sulfonate are high molecular weight viscous compounds. If heat is used to reduce the viscosity and to speed the reaction, some increase in the rate of the reaction is observed but many side reactions such as polymerization, oxidation, charring, decomposition, and improper substitution may also occur resulting in impure non-uniform products of inferior color and odor. The viscosity of the reaction mass is so high that mixing is practically impossible, hence special equipment and a greater amount of energy are required to effect mixing which often renders the cost of manufacture prohibitive. Improper mixing results in localized overheating and overreaction in various parts of the reaction mass and substantially no change in others. Cooling, direct or indirect, is likewise not very effective because of the high viscosity of the mass.

In an attempt to overcome some of the foregoing disadvantages, it has been proposed to sulfonate an alkyl aryl hydrocarbon using sulfur trioxide as the sulfonating agent wherein both the alkyl aryl hydrocarbon and the sulfur trioxide are diluted with sulfur dioxide. Liquid sulfur dioxide serves several functions in the preparation of these substances, which functions are not obtainable with any other organic or inorganic liquid. Liquid sulfur dioxide is an excellent solvent for the alkyl aryl hydrocarbon, the sulfur trioxide of the resulting sulfonate and, because of that fact, a single phase reaction takes place. In addition, the viscosity of the mass may be varied at will so that through mixing a high degree of turbulence may be imparted to the solution. Also, because of its low boiling point, liquid sulfur dioxide is very effective as a refrigerant. Thus, temperature control either directly or indirectly is easily effected. A portion of the liquid may be evaporated to absorb the heat of vaporization thereof from the reaction mixture and thus refrigerate it effectively. Another important feature in the use of liquid sulfur dioxide which is of major importance is the fact that it affects the rate of reaction of the various constituents. It has been reported in the literature that liquid sulfur dioxide appears to form loose addition products with certain other reactants, and this in all probability alters their relative reactivity. The low boiling point of liquid sulfur dioxide renders it a relatively simple matter to remove the excess solvent from the final product.

Although the use of sulfur dioxide as a solvent in the foregoing process makes for an improved product as compared to the product obtainable by many other processes, the results are not all that are desired. For example, if great care is not taken in regard to the temperature of sulfonation, to the rate of sulfonation, and to adequate heat removal, the resulting product is very likely to be of a dark color and possess a disagreeable odor.

It is therefore a principal object of this invention to provide a process which will obviate the disadvantages of the prior art processes. It is another object of the present invention to provide an efficient and economical process for the sulfonation of alkyl aryl hydrocarbons with sulfur trioxide using sulfur dioxide as a solvent. Another object of my invention is to provide a process for the sulfonation of alkyl aryl hydrocarbons whereby alkyl aryl sulfonic acids may be produced of high purity by a process which is simple and inexpensive. These and other objects and advantages of the invention will become apparent as the invention is hereinafter more fully discussed.

To the accomplishment of the foregoing and related ends, this invention then comprises the features hereinafter fully described and particularly pointed out in the claims. The following description setting forth in detail certain illustrative embodiments of the invention, these being indicative, however, of but a few of the various ways in which the principle of the invention may be employed.

Broadly stated, the present invention comprises a process for the preparation of alkyl aryl sulfonic acids wherein the alkyl aryl hydrocarbon diluted with sulfur dioxide is added to a first compartment of a multiple-compartment reactor. Sulfur trioxide diluted with sulfur dioxide is then added to the alkyl aryl hydrocarbon-sulfur dioxide solution contained in the first compartment under sulfonating conditions and in an amount that is insufficient to sulfonate completely the alkyl aryl hydrocarbon contained in the first compartment. The partially sulfonated alkyl aryl hydrocarbon diluted with sulfur dioxide is then allowed to flow into the second compartment of the reactor wherein it is again contacted with an amount of sulfur trioxide diluted with sulfur dioxide in an amount that is insufficient to sulfonate completely the alkyl aryl hydrocarbon contained in the partially sulfonated alkyl aryl hydrocarbon-sulfur dioxide solution. The partially sulfonated alkyl aryl hydrocarbon contained in the second compartment is then allowed to flow through the remaining compartments in sequence of the reactor wherein each compartment it is again contacted with sulfur trioxide diluted with sulfur dioxide. In the last compartment the amount of sulfur trioxide used is sufficient to sulfonate completely the remaining alkyl aryl hydrocarbon contained in the partially sulfonated alkyl aryl hydrocarbon-sulfur dioxide solution contained in that compartment. The completely sulfonated alkyl aryl hydrocarbon may then be neutralized if desired to produce a sulfonate salt of excellent color, odor, and other properties.

Salient features of the present invention comprise effective mixing, circulation of the reactants passed confluently through the several zones, or compartments, of the reaction vessel, and efficient removal of the heat of reaction therefrom. The sulfonating mixture and the hydrocarbon feeds are preferably measured and continuously introduced as liquids into the reaction vessel.

Before proceeding with specific examples illustrating my invention it may be well to indicate in general the types of compounds that may be sulfonated in the process.

Suitable alkaryl hydrocarbons that may be used include those formed by alkylating benzene, toluene, xylenes, cumene, naphthalene, alkylnaphthalene, diphenyl, alkydiphenyl, and their halogen derivatives such as chlorobenzene, chlorotoluene and chloronaphthalene. Preferred organic hydrocarbons are benzene or toluene reacted with tri-, tetra, or penta-propylene fractions obtained by the polymerization of propylene, as for example dodecylbenzene which is obtainable under the trade name of Neolene 400. Physical properties of Neolene 400 are as follows:

| | |
|---|---|
| Specific gravity at 16° C | 0.8742 |
| Average molecular weight | 232 |
| A. S. T. M., .D–158 Engler: | |
| I. B. P °F | 535 |
| 5 °F | 545 |
| 10 °F | 550 |
| 50 °F | 560 |
| 90 °F | 580 |
| 97 °F | 592 |
| F. B. P °F | 603 |
| Refractive index at 20° C | 1.4885 |
| Viscosity at 20° C centipoises | 14 |
| Bromine number | 0.16 |

Another suitable alkaryl hydrocarbon is the compound called postdodecylbenzene which is a mixture of monoalkylbenzene and dialkylbenzenes in the approximate ratio of 2:3. Its typical physical properties are as follows:

| | |
|---|---|
| Specific gravity at 38° C | 0.8649 |
| Average molecular weight | 385 |
| Percent sulfonatable | 88 |
| A. S. T. M., .D–158 Engler: | |
| I. B. P °F | 647 |
| 5 °F | 682 |
| 50 °F | 715 |
| 90 °F | 760 |
| 95 °F | 775 |
| F. B. P °F | 779 |
| Refractive index at 23° C | 1.4900 |
| Viscosity at: | |
| −10° C centipoises | 2800 |
| 20° C do | 280 |
| 40° C do | 78 |
| 80° C do | 18 |
| Analine point °C | 69 |
| Pour point °F | −25 |

Sulfonation may be accomplished using either sulfur trioxide or a stabilized liquid sulfur trioxide having more than 99 percent available $SO_3$ content as is available commercially under the trade name "Sulfan." Unrefined sulfur trioxide as obtained from the catalytic oxidation of sulfur dioxide may also be used. The sulfur trioxide may be used undiluted or preferably diluted with sulfur dioxide. Concentrations of from 10% to 90% by weight sulfur trioxide in the diluent are operable, depending on the amount of sulfur dioxide used as a diluent for the alkyl aryl hydrocarbon. Temperatures during the reaction may be maintained at from about 30 to 100° C. I prefer a temperature of 50 to 60° C. since below 50° the viscosity of the reacting mixture increases with lowering temperature. With increasing viscosity local overheating takes place with subsequent charring because of increased mixing difficulties. At temperatures above about 60°, there is increasing charring and resulting darkening of product.

As is well known the reaction between $SO_3$ and the alkyl aryl hydrocarbon is highly exothermic, but the temperature is easily controlled as the sulfur dioxide will evaporate and the heat required for evaporating the sulfur dioxide will be enough to carry off the heat of reaction.

For a more complete understanding of the nature and objects of the invention reference should be made to the following detailed description taken in connection with the accompanying drawing, in which the single figure is a view representing in diagrammatic form apparatus suitable for use in carrying out the present process. In the interest of simplicity valves, flow and pressure controllers, and similar appurtenances necessary for the operation of the process have been omitted from the drawing. These items and their operation are well known, consequently are not illustrated or described in detail.

In the drawing the numeral 1 represents a vessel provided with a jacket suitable for heating and cooling which is adapted to be used in carrying out sulfonation reactions in several stages and is hereinafter referred to as a multiple-compartment sulfonator. Although in the drawing the multiple-compartment sulfonator is shown with three compartments, it will be obvious to those skilled in the art that any number of compartments may be used. For most practical purposes three compartments will be sufficient. To insure adequate mixing of the contents each compartment of the sulfonator is provided with an agitator 33. The numeral 2 represents a container for the liquid alkyl aryl hydrocarbon, numeral 3 represents a container for holding a supply of liquid sulfur dioxide, and the numeral 4 represents a container for holding a supply of liquid sulfur trioxide. Line 5 leading from container 4 is the suction line to the pump 6. The discharge line from pump 6, line 7, leads to the sulfonator. Line 8 from container 3 is the intake to pump 9. Line 10, the discharge of pump 9, joins line 7. Line 11 from container 2 is connected to the intake of pump 12, and line 13 is connected to the discharge of pump 12 and leads to the vent gas absorber, item 35 in the drawing. Liquid sulfur dioxide is added to item 35, the vent gas absorber, through line 32, where it is mixed with and serves as a diluent for the alkyl aryl hydrocarbon. From the vent gas absorber, item 35, the diluted alkyl aryl hydrocarbon is fed to the sulfonator through line 34. As mentioned above, the alkyl aryl hydrocarbon is only partially sulfonated in the first compartment of the sulfonator. From the first compartment the partially sulfonated alkyl aryl hydrocarbon flows into the second compartment, where it is again contacted with an additional quantity of sulfur trioxide diluted with sulfur dioxide. The amount of sulfur trioxide used in the second compartment is insufficient to sulfonate completely the alkyl aryl hydrocarbon contained in the partially sulfonated alkyl aryl hydrocarbon-sulfur dioxide solution. From the second compartment the partially sulfonated alkyl aryl hydrocarbon flows into the third compartment, where it is again contacted with an additional quantity of sulfur trioxide dissolved in sulfur dioxide. The amount of sulfur trioxide used in the third compartment is sufficient to sulfonate completely any unsulfonated alkyl aryl hydrocarbon contained in the reaction mixture derived from the second compartment. The reaction mixture from the third compartment, in liquid form, is withdrawn from the sulfonator through line 14, which leads to the intake of pump 15. The exhaust of pump 15 is connected to line 16, which is the feed to the sulfur dioxide stripper, item 17. In the sulfur dioxide striper sulfur dioxide is removed from the sulfonic acid-sulfur trioxide mixture. The sulfonic acid and sulfur trioxide are removed from the $SO_2$ stripper through line 18, which is connected to the intake of pump 19. From pump 19 the sulfonic acid and sulfur trioxide are fed to the vacuum separator 21 through line 20. In this separator, item 21, sulfur trioxide is discharged through line 23 and the desired sulfonic acid product is removed through line 22. Sulfur dioxide is removed from item 17 through line 24 and then through the compressors 25, 27. A certain amount of sulfur dioxide will be evaporated in the sulfonator by the heat of reaction and this sulfur dioxide is removed through line 26, which also passes through the compressor 27. From the compressors the sulfur dioxide mixture flows through line 28 and through condenser 29, where high boiling constituents are removed. After passing through the condenser, the sulfur dioxide passes through line 30 and back into the liquid sulfur dioxide container, item 3.

In order to disclose more clearly the nature of the present invention and the advantages thereof, reference will hereinafter be made to certain specific embodiments which illustrate the flexibility of the herein described process. It should be clearly understood, however, that this is done solely by way of example and is not to be construed as a limitation upon the spirit and scope of the appended claims. As for example, a three compartment sulfonator was used in these specific embodiments but as mentioned above equally satisfactory results may be obtained using a sulfonator containing a greater number of compartments. As another modification, the degree of sulfonation in each of the compartments except the last may be varied. I have obtained excellent results wherein 60 to 98 percent of alkyl aryl hydrocarbon was sulfonated in the first compartment, 60 to 98 percent of the unsulfonated alkyl aryl hydrocarbon contained in the partially sulfonated alkyl aryl hydrocarbon was sulfonated in the second compartment, and the remaining unsulfonated alkyl aryl hydrocarbon was completely sulfonated in the third compartment.

188 parts of dodecylbenzene ("Neolene 400") diluted with 66.6 parts of sulfur dioxide was added to the first compartment and approximately 80% of the dodecylbenzene was sulfonated by 51.8 parts of sulfur trioxide diluted by 15.6 parts of sulfur dioxide. In the second compartment 11.68 parts of sulfur trioxide diluted by 3.51 parts of sulfur dioxide was added to sulfonate the dodecylbenzene to approximately 98%. In the third compartment the sulfonation of the dodecylbenzene was completed by the addition of 2.33 parts of sulfur trioxide diluted by .7 part of sulfur dioxide. 28.34 parts of sulfur dioxide was removed by evaporation thus maintaining the operating temperature at approximately 55° C. The reaction product diluted with sulfur dioxide and a small amount of sulfur trioxide was removed from the third compartment, and in the sulfur dioxide stripper about 58.0 parts of sulfur dioxide was removed. The remaining reaction product was fed to the vacuum separator where 249.5 parts of dodecylbenzene sulfonic acid of excellent color and odor was recovered.

The procedure was repeated with the exception that 310 parts of postdodecylbenzene was substituted for the 188 parts of dodecylbenzene. The final product obtained by neutralizing the postdodecylbenzene sulfonic acid was very light in color and the odor was excellent. Similar results were obtained when other alkyl aryl hydrocarbons were substituted for dodecylbenzene and postdodecylbenzene.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. An improved process for sulfonating an alkyl aryl hydrocarbon formed by alkylating an aromatic hydrocarbon of the benzene series containing from 6 to 9 carbon atoms with sulfur trioxide which comprises dissolving said alkyl aryl hydrocarbon in sulfur dioxide, adding the resulting solution of alkyl aryl hydrocarbon and sulfur dioxide to a first compartment of a multiple compartment sulfonator, adding sulfur trioxide diluted with sulfur dioxide to said alkyl aryl hydrocarbon-sulfur dioxide solution contained in said first compartment under sulfonating conditions and in an amount that is insufficient to sulfonate completely said alkyl aryl hydrocarbon, allowing the resulting partially sulfonated alkyl aryl hydrocarbon to flow from said first compartment through the succeeding compartments of said multiple compartment sulfonator wherein the partially sulfonated alkyl aryl hydrocarbon is contacted with an additional quantity of sulfur trioxide diluted with sulfur dioxide in each of the succeeding compartments whereby the unsulfonated alkyl aryl hydrocarbon content in said partially sulfonated alkyl aryl hydrocarbon is progressively decreased, and the unsulfonated alkyl aryl hydrocarbon contained therein is completely sulfonated in the last compartment of said multiple compartment sulfonator.

2. An improved process for sulfonating an alkaryl hydrocarbon formed by alkylating an aromatic hydrocarbon of the benzene series containing from 6 to 9 carbon atoms with sulfur trioxide which comprises dissolving said alkyl aryl hydrocarbon in sulfur dioxide, adding the resulting solution of alkaryl hydrocarbon and sulfur dioxide to a first compartment of a three-compartment sulfonator, adding sulfur trioxide diluted with sulfur dioxide to said alkaryl hydrocarbon-sulfur dioxide solution contained in said compartment under sulfonating conditions and in an amount sufficient to sulfonate 60 to 98 percent of said alkyl aryl hydrocarbon, allowing said partially sulfonated alkaryl hydrocarbon to flow into the second compartment of said sulfonator, adding sulfur trioxide diluted with sulfur dioxide to said partially sulfonated alkaryl hydrocarbon under sulfonating conditions in an amount sufficient to sulfonate 60 to 98 percent of the unsulfonated alkaryl hydrocarbon contained in said partially sulfonated alkaryl hydrocarbon, allowing the partially sulfonated alkaryl hydrocarbon to flow from said second compartment into the third compartment of said sulfonator, and then adding sufficient sulfur trioxide diluted with sulfur dioxide to said partially sulfonated alkaryl hydrocarbon under sulfonating conditions to sulfonate completely the unsulfonated alkaryl hydrocarbon contained therein.

3. The process of claim 1 wherein the alkyl aryl hydrocarbon is dodecylbenzene.

4. The process of claim 1 wherein the alkyl aryl hydrocarbon is a mixture of monoalkylbenzene and dialkylbenzene in the approximate ratio of 2:3.

5. The process of claim 1 wherein the temperature during the sulfonation reaction is maintained within the limits of 30 to 100° C.

6. The process of claim 1 wherein the temperature during the sulfonation reaction is maintained within the limits of 50 to 60° C.

7. The process of claim 1 wherein the weight percent of the sulfur trioxide in the sulfur trioxide-sulfur dioxide solution used for sulfonating the alkyl aryl hydrocarbon based on the weight of the sulfur dioxide varies from 10–90.

References Cited in the file of this patent

UNITED STATES PATENTS 2,768,199   Luntz et al. _____ Oct. 23, 1956

FOREIGN PATENTS 664,577   Great Britain _____ Jan. 9, 1952